(12) United States Patent
Miyano

(10) Patent No.: US 6,327,101 B1
(45) Date of Patent: Dec. 4, 2001

(54) OBJECTIVE LENS FOR VARIABLE VIEWING DEPTH ENDOSCOPE

(75) Inventor: Hitoshi Miyano, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/519,861

(22) Filed: Mar. 6, 2000

(30) Foreign Application Priority Data

Mar. 12, 1999 (JP) ................................. 11-066651
Mar. 2, 2000 (JP) ................................. 12-057634

(51) Int. Cl.$^7$ .......................... G02B 21/02; G02B 25/00; G02B 15/14
(52) U.S. Cl. ................ 359/691; 359/656; 359/657; 359/658; 359/659; 359/660; 359/661; 359/642
(58) Field of Search ................... 359/656–661, 359/642, 691

(56) References Cited

U.S. PATENT DOCUMENTS 4,854,685 * 8/1989 Corbasson ................. 359/683
5,940,220 * 8/1999 Suenaga ................. 359/660
6,160,668 * 12/2000 Rogers ................. 359/674

\* cited by examiner

*Primary Examiner*—Georgia Epps
*Assistant Examiner*—Michael A. Lucas
(74) *Attorney, Agent, or Firm*—Snider & Associates; Ronald R. Snider

(57) ABSTRACT

A variable viewing depth endoscope comprises, successively from the object side, a first lens group $G_1$ having positive refractive power and a second lens group $G_2$ which has positive refractive power and is movable along the optical axis are arranged. Focusing at the near point side is made possible by moving the second lens group $G_2$ to the object side, and focusing at a far point side is made possible by moving the second lens group $G_2$ to an image side. The composite focal length $f_N$ during near point viewing is made shorter than a composite focal length $f_F$ of a whole system during far point viewing.

12 Claims, 4 Drawing Sheets

EXAMPLE 1

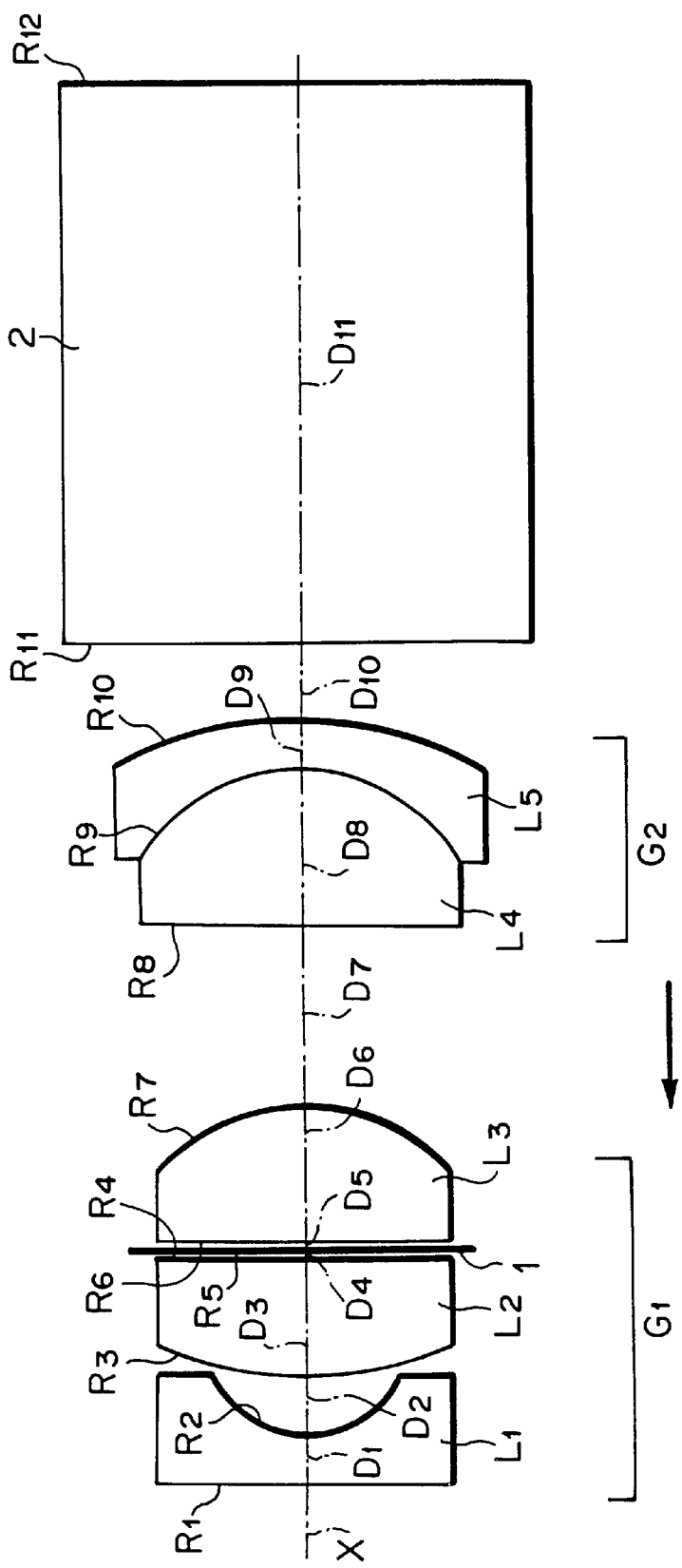

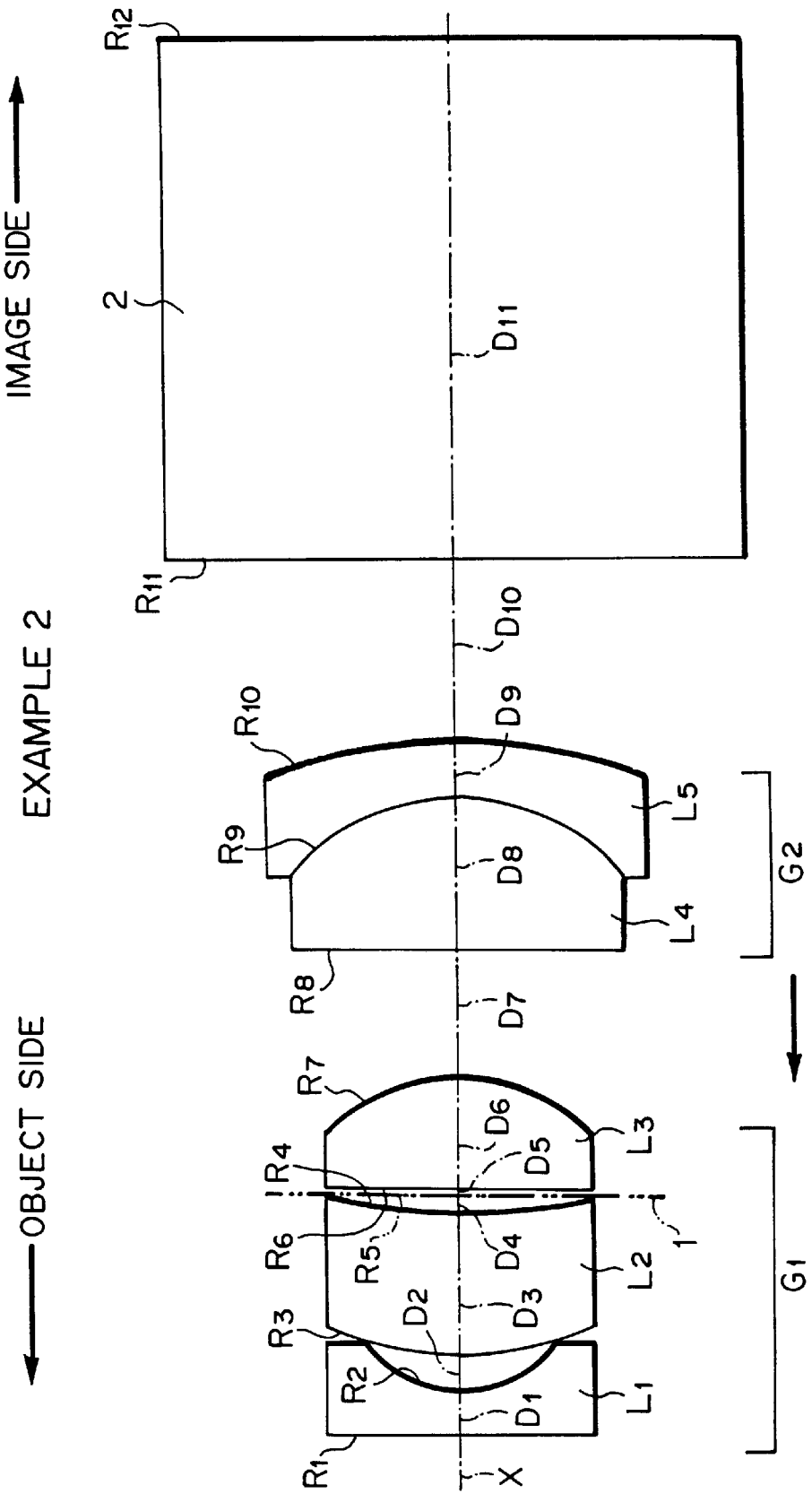

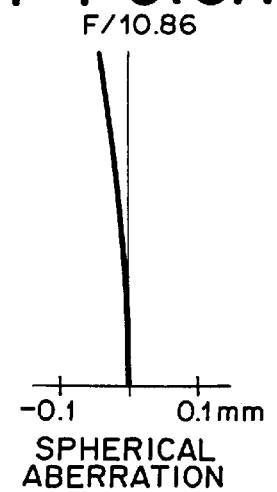
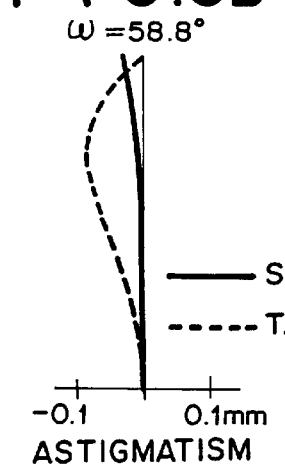
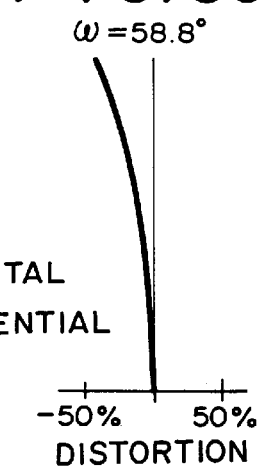
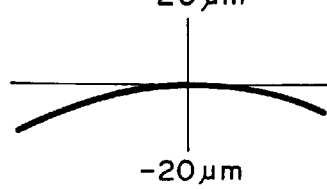
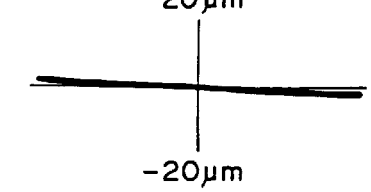
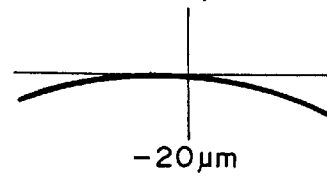
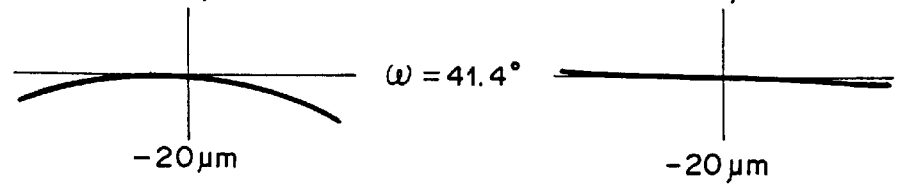
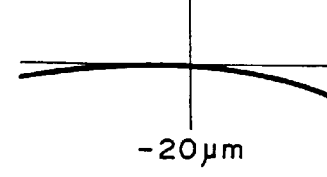
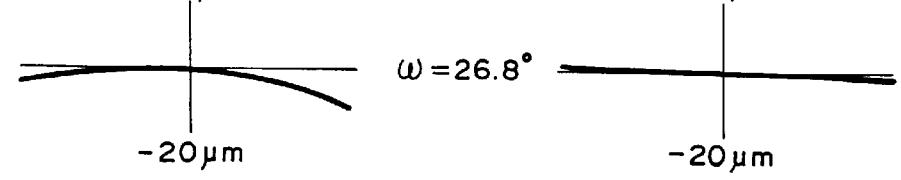

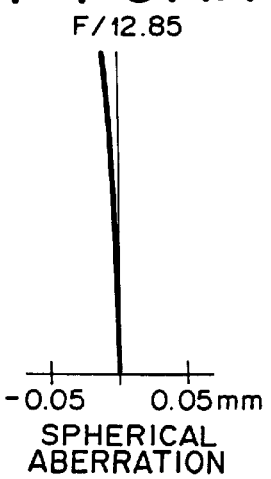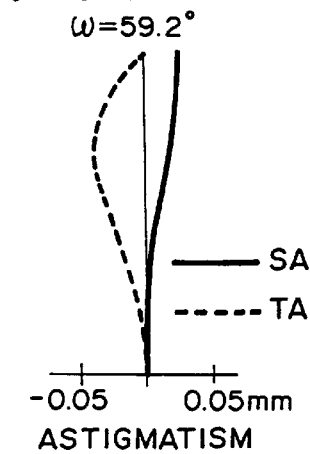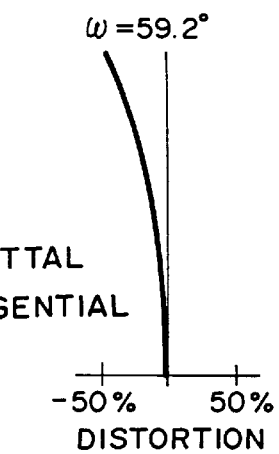

OBJECTIVE LENS FOR VARIABLE VIEWING DEPTH ENDOSCOPE

RELATED APPLICATIONS

This application claims the priorities of Japanese Patent Application No. 11-066651 filed on Mar. 12, 1999 and Japanese Patent Application No. 2000-057634 filed on Mar. 2, 2000, which are incorporated herein by reference.

BACKGROUND OF THE INVENTION

1. Field of the Invention

The present invention relates to an objective lens disposed at the tip portion of an endoscope, and particularly relates to an objective lens for an endoscope having a focusing mechanism.

2. Description of the Prior Art

Conventionally, a general objective lens for an endoscope comprises a first lens group with positive refractive power and a second lens group with negative refractive power, and has about an 8–100 mm viewing range on the object side.

In an endoscope employing such an objective lens, the viewing subject is located in the depth of field of the objective lens, and picture images are transmitted by a solid imaging element such as a CCD or an image guide fiber.

Moreover, in order to observe viewing subjects such as the affected parts as a whole, it is preferable to locate an objective lens apart from the viewing subjects, and to locate the objective lens close to the viewing subjects so as to observe the viewing subjects in detail. In particular, in recent medical treatments demanding highly precise observation and more accurate diagnosis, it is desirable to develop an objective lens for an endoscope which can provide preferable picture images over a wide viewing range.

However, in the above-described conventional objective lens for an endoscope, the depth of field is fixed because of a fixed diaphragm, and viewing subjects cannot be clearly observed beyond the depth of field.

There is also an objective lens for an endoscope having a focusing mechanism. However, since the objective lens consists of a first lens group having negative refractive power and a second lens group having positive refractive power, it is difficult to preferably correct various aberrations such as coma when a concave lens is too powerful in the first lens group with negative refractive power, which thus requires further improvements.

SUMMARY OF THE INVENTION

In view of such circumstances, it is an object of the present invention to provide a simple objective lens for an endoscope which can provide preferable picture images over a wide perspective viewing range.

An objective lens for a variable viewing depth endoscope in accordance with the present invention comprises, successively from the object side, a first lens group having positive refractive power and a second lens group which has positive refractive power and which is movable along the optical axis; wherein near point focusing is made possible with the second lens group moved to the object side, and far point focusing is made possible with the second lens group moved to the image side; and wherein the composite focal length $f_N$ of a whole system at the near point view is set to be shorter than a composite focal length $f_F$ of the whole system at the far point view.

Also, the objective lens for a variable viewing depth endoscope in accordance with the present invention satisfies the following conditional expression (1):

$$0.5 < f_1/f_2 < 0.7 \tag{1}$$

wherein $f_1$ is a focal length of the first lens group, and $f_2$ is a focal length of the second lens group.

Moreover, the objective lens for a variable viewing depth endoscope in accordance with the present invention has a brightness diaphragm disposed in the first lens group.

Furthermore, in the objective lens for a variable viewing depth endoscope in accordance with the present invention, the first lens group, successively from the object side, comprises a concave lens having a surface with strong curvature directed onto the image side, a convex lens having a surface with strong curvature directed onto the object side, a brightness diaphragm and a convex lens having a surface with strong curvature directed onto the image side.

Here, both of the image-side surfaces of the convex lens having a surface with strong curvature directed onto the object side and the object-side surface of the convex lens having a surface with strong curvature directed onto the image side may be made flat.

In the objective lens for a variable viewing depth endoscope in accordance with the present invention, moreover, the mobility of the second lens group is set to be located at a location nearly identical to a near point of depth of field with the second lens group moved closest to the image side and the far point of depth of field with the second lens group moved closest to the object side.

BRIEF DESCRIPTION OF THE DRAWINGS

FIG. 1 is a figure showing the configuration of an objective lens for an endoscope relating to Example 1 of the present invention;

FIG. 2 is a figure showing the configuration of an objective lens for an endoscope relating to Example 2 of the present invention;

FIGS. 3A, 3B, 3C and 3D are figures showing various aberrations (spherical aberration, astigmatism, distortion, and coma) of the objective lens for an endoscope relating to Example 1 of the present invention; and FIGS. 4A, 4B, 4C and 4D are figures showing various aberrations (spherical aberration, astigmatism, distortion, and coma) of the objective lens for an endoscope relating to Example 2 of the present invention.

DESCRIPTION OF THE PREFERRED EMBODIMENTS

An embodiment of an objective lens for a variable viewing depth endoscope in accordance with the present invention is explained hereafter, with reference to the drawings.

FIG. 1 shows a fundamental lens configuration relating to Example 1 of the present invention, and FIG. 2 shows a fundamental lens configuration relating to Example 2 of the present invention.

As shown in FIGS. 1 and 2, the objective lens for an endoscope relating to the embodiment of the present invention comprises, successively from an object side, a first lens group $G_1$ having positive refractive power and a second lens group $G_2$ which has positive refractive power and which is movable along an optical axis X.

This objective lens for an endoscope is configured to carry out focusing at a near point with the second lens group $G_2$ moved to the object side and also focusing at a far point with the second lens group $G_2$ moved to an image side, and to set a composite focal length $f_N$ of a whole system at near point viewing shorter than a composite focal length $f_F$ of the whole system at far point viewing.

Also, the first lens group $G_1$ comprises, successively from the object side, a first lens $L_1$ consisting of a concave lens having a surface with strong curvature directed onto the image side, a second lens $L_2$ consisting of a convex lens having a surface with strong curvature directed onto the object side, a brightness diaphragm 1, and a third lens $L_3$ consisting of a convex lens having a surface with strong curvature directed onto the image side.

In the first lens group $G_1$ of Example 1 herein, the first lens $L_1$ consists of a plano-concave lens with its concave surface directed onto the image side; the second lens $L_2$ consists of a plano-convex lens with its convex surface directed onto the object side; and the third lens $L_3$ consists of a plano-convex lens with its convex surface directed onto the image side. Moreover, the first lens group $G_1$ of Example 2 has almost the same configuration as that of Example 1, except that the second lens $L_2$ is a positive meniscus lens with a convex surface directed onto the object side.

Moreover, the second lens group $G_2$ comprises, successively from the object side, a fourth lens $L_4$ consisting of a plano-convex lens with its convex surface directed onto the image side and a fifth lens $L_5$ consisting of a negative meniscus lens with its concave surface directed onto the object side; and the fourth lens $L_4$ and the fifth lens $L_5$ are mutually cemented as a cemented lens. Furthermore, a ray direction changing prism 2 is provided on the image side of the second lens group $G_2$; and a CCD element or an image guide fiber is provided on the image side where the prism 2 is not shown, so as to transmit picture image information.

In the objective lens for an endoscope in accordance with the embodiments of the present invention, positive power is given to the first lens group $G_1$ by providing the second lens $L_2$ as a convex lens having a surface with strong curvature directed onto the object side and the third lens $L_3$ as a convex lens having a surface with strong curvature directed onto the image side, so that various aberrations such as coma may be preferably corrected.

Also, by providing the brightness diaphragm 1 in the first lens group $G_1$, a diameter of the first lens group $G_1$ may be made smaller. In other words, when the brightness diaphragm is provided on a rear side from the first lens group $G_1$, a diameter of the first lens group $G_1$ will be large, which is not thus preferable as an objective lens for an endoscope.

Moreover, the objective lens for an endoscope in accordance with the embodiments of the present invention satisfies the following conditional expression (1):

$$0.5 < f_1/f_2 < 0.7 \quad (1)$$

wherein $f_1$ is a focal length of the first lens group, and $f_2$ is a focal length of the second lens group.

The above-noted conditional expression (1) defines a ratio $(f_1/f_2)$ between the focal length $f_1$ of the first lens group $G_1$ and the focal length $f_2$ of the second lens group $G_2$. When $f_1/f_2$ is below the lower limit, the power of the second lens group $G_2$ will be too weak and the moving distance for focusing will be too long, so that a whole length of the hard tip of an endoscope will be too long, which is not preferable as an objective lens for an endoscope. On the other hand, when $f_1/f_2$ is beyond the upper limit, the back focus of the whole system will not be sufficiently long and it will be difficult to insert a ray direction changing prism 2 for providing an imaging element such as a CCD at a predetermined location.

Furthermore, it is preferable, in the objective lens for an endoscope in accordance with the embodiments of the present invention, that the mobility of the second lens group $G_2$ is set to be located at a location nearly identical to the near point of the depth of field with the second lens group $G_2$ moved closest to the image side and a far point of depth of field with the second lens group $G_2$ moved closest to the object side.

In other words, a whole length of the hard tip is controlled in an actual endoscope, so that the mobility of the second lens group $G_2$ is small and it is sometimes difficult to adjust the mobility over the whole moving range of the second lens group $G_2$. In this case, by setting the mobility of the second lens group $G_2$ to achieve the above-described depth of field correlation, a depth of field range will continue to two points—the farthest point and the nearest point; and by moving the second lens group $G_2$ to the two points—the farthest point and the nearest point, observation can be carried out over the whole moving range of the second lens group $G_2$.

The depth of field may be calculated by the formula below.

For a (permissible circle of confusion) diameter ($\delta$) which will be the basis for calculating the field of depth in an electronic endoscope, 2V/240 mm is used herein. This is a value where the vertical screen size is divided by the number of TVs equivalent to 3 MHz of a television having a resolution which can nearly satisfy the picture image of an electron endoscope, and the size is then multiplied by two.

$$y = \pm \delta/(2\tan\omega)$$

wherein $\delta$ is the (permissible circle of confusion) diameter.

$$\omega = \sin^{-1}(\tfrac{1}{2}F_{NO})$$

$$D = -(f^2/(x' \pm y)) + Ff$$

wherein Ff is front focus, and x' is $-f^2/x$.

Examples 1 and 2 of the present invention will be explained below in detail.

EXAMPLE 1

The top part of Table 1 shows the radius of curvature R (mm) of each lens surface of Example 1, an axial surface spacing of each lens (a central thickness of each lens and an air gap between neighboring lenses) D (mm), and refractive index N and Abbe number v of each lens at the d-line. Also, the numerals in Table 1 indicate the successive order from the object side (same as Table 2).

Moreover, the mid-part of Table 1 shows air gaps D (mm) of the best focusing locations on the seventh surface and the tenth surface in this Example 1.

Furthermore, the bottom-part of Table 1 shows the focal length f (mm), the front focus Ff (mm), the F number, the focal length $f_1$ (mm) of the first lens group $G_1$, the focal length $f_2$ (mm) of the second lens group $G_2$, $f_1/f_2$ in the conditional expression (1), a range (mm) of an image on an imaging surface, a (permissible circle of confusion) diameter $\delta$ (mm), and the depth of field (mm) in the Example 1. The focal length f ($f_F$, $f_N$), front focus Ff ($Ff_F$, $Ff_N$), F number, and depth of field indicate each value on the far point side (F) and the near point side (N).

TABLE 1

Example 1

| Surface | R | D | $N_d$ | $v_d$ |
|---|---|---|---|---|
| 1 | ∞ | 0.400 | 1.88300 | 40.9 |
| 2 | 0.832 | 0.500 | 1.00000 | |
| 3 | 3.125 | 1.000 | 1.80518 | 25.4 |
| 4 | ∞ | 0.050 | 1.00000 | |
| 5 | (diaphragm) | 0.000 | 1.00000 | |
| 6 | ∞ | 1.200 | 1.62041 | 60.3 |
| 7 | −1.594 | *1 | 1.00000 | |
| 8 | ∞ | 1.300 | 1.62041 | 60.3 |
| 9 | −1.471 | 0.400 | 1.80518 | 25.4 |
| 10 | −3.033 | *2 | 1.00000 | |
| 11 | ∞ | 5.338 | 1.55919 | 53.9 |
| 12 | ∞ | | | |

| | Far Point Side | Near Point Side |
|---|---|---|
| Best Focusing Location | 12.000 | 1.758 |
| *1 | 1.600 | 0.100 |
| *2 | 0.638 | 2.138 |

| Far Point Side | $f_F$ | 1.9207 | $Ff_F$ | 0.4361 | $F_{NO.}$ | 10.862 |
|---|---|---|---|---|---|---|
| Near Point Side | $f_N$ | 1.7182 | $Ff_N$ | 0.3288 | $F_{NO.}$ | 11.332 |
| | $f_1$ | 3.5592 | | | | |
| | $f_2$ | 6.7910 | | | $f_1/f_2$ | 0.5241 |

| | |
|---|---|
| Range of an image on an imaging surface | 3.6 × 2.7 |
| Permissible circle of confusion diameter δ | 0.0225 |
| Depth of field on the far point side | 6.4–69.8 |
| Depth of field on the near point side | 1.44–2.22 |

Clearly shown in Table 1, the value corresponding to the conditional expression (1) is $f_1/f_2$=0.5241 in Example 1, satisfying the conditional expression (1).

EXAMPLE 2

The top part of Table 2 shows the radius of curvature R (mm) of each lens surface of Example 2, the axial surface spacing of each lens (a central thickness of each lens and an air gap between neighboring lenses) D (mm), and the refractive index N and Abbe number v of each lens at the d-line.

Moreover, the mid-part of Table 2 shows air gaps D (mm) of the best focusing locations on the seventh surface and the tenth surface in this Example 2.

Furthermore, the bottom-part of Table 2 shows the focal length f (mm), the front focus Ff (mm), the F number, the focal length $f_1$ (mm) of the first lens group $G_1$, the focal length $f_2$ (mm) of the second lens group $G_2$, $f_1/f_2$ in the conditional expression (1), a range (mm) of an image on an imaging surface, a (permissible circle of confusion) diameter δ (mm), and a depth of field (mm) in the Example 2. The focal length f ($f_F$, $f_N$), front focus Ff ($Ff_F$, $Ff_N$), F number, and depth of field indicate each value on the far point side (F) and the near point side (N).

TABLE 2

Example 2

| Surface | R | D | $N_d$ | $v_d$ |
|---|---|---|---|---|
| 1 | ∞ | 0.400 | 1.88300 | 40.9 |
| 2 | 1.055 | 0.330 | 1.00000 | |
| 3 | 2.860 | 1.300 | 1.80518 | 25.4 |
| 4 | 6.230 | 0.060 | 1.00000 | |
| 5 | (diaphragm) | 0.040 | 1.00000 | |
| 6 | ∞ | 1.100 | 1.71300 | 53.9 |
| 7 | −1.742 | *1 | 1.00000 | |
| 8 | ∞ | 1.400 | 1.71300 | 53.9 |
| 9 | −1.901 | 0.500 | 1.80518 | 25.4 |
| 10 | −4.756 | *2 | 1.00000 | |
| 11 | ∞ | 6.557 | 1.55919 | 53.9 |
| 12 | ∞ | | | |

TABLE 2-continued

Example 2

| | Far Point Side | Near Point Side |
|---|---|---|
| Best Focusing Location | 15.000 | 5.000 |
| *1 | 1.200 | 0.290 |
| *2 | 1.757 | 2.667 |

| Far Point Side | $f_F$ | 2.5483 | $Ff_F$ | 0.1912 | $F_{NO.}$ | 12.853 |
|---|---|---|---|---|---|---|
| Near Point Side | $f_N$ | 2.4206 | $Ff_N$ | 0.1061 | $F_{NO.}$ | 13.412 |
| | $f_1$ | 5.4117 | | | | |
| | $f_2$ | 8.1245 | | | $f_1/f_2$ | 0.6661 |

| | |
|---|---|
| Range of an image on an imaging surface | 4.8 × 3.6 |
| Permissible circle of confusion diameter δ | 0.03 |
| Depth of field on the far point side | 7.8–154 |
| Depth of field on the near point side | 3.7–7.8 |

Clearly shown in Table 2, the value corresponding to the conditional expression (1) is $f_1/f_2$=0.6661 in this Example 1, satisfying the conditional expression (1).

Also, the near point of the depth of field with the second lens group $G_2$ moved closest to the image side and the far point of the depth of field with the second lens group $G_2$ moved closest to the object side are 7.8 mm respectively: the range of the depth of field continues to the farthest point side and the nearest point side and the second lens group $G_2$ is moved to two points—the farthest point side and the nearest point side, so that it is possible to view over the moving range of the second lens group $G_2$.

Various aberrations (spherical aberration, astigmatism, distortion, coma) of Example 1 and Example 2 are shown in FIGS. 3 and 4 respectively. Moreover, each aberration in FIG. 3 shows an aberration when the second lens group $G_2$ is moved from the far point side to the object side by 0.4 mm, and each aberration in FIG. 4 shows an aberration when the second lens group $G_2$ is moved to the farthest point side. Furthermore, in each astigmatism and coma figure, aberrations relative to a sagittal image surface and a tangential image surface are shown.

As clearly shown in FIGS. 3 and 4, according to each embodiment mentioned above, the above-described aberrations are all made preferable.

As explained above, in accordance with the objective lens for a variable viewing depth endoscope of the present invention, by providing positive refractive power to the first lens group, various aberrations such as coma may be corrected preferably, and furthermore, preferable images may be obtained over a wide perspective viewing range by having a controlling mechanism of focal length.

What is claimed is:

1. An objective lens for a variable viewing depth endoscope comprising, successively from an object side, a first lens group having positive refractive power and a second lens group which has positive refractive power and is movable along an optical axis; wherein near point focusing is made possible with the second lens group moved to the object side, and far point focusing is made possible with the second lens group moved to an image side; and wherein the composite focal length $f_N$ of the whole system at near point viewing is set to be shorter than a composite focal length $f_F$ of the whole system at far point viewing.

2. The objective lens for the variable viewing depth endoscope of claim 1, satisfying the following conditional expression (1):

$$0.5 < f_1/f_2 < 0.7 \tag{1}$$

wherein $f_1$ is a focal length of the first lens group, and $f_2$ is a focal length of the second lens group.

3. An endoscope comprising an objective lens for a variable viewing of depth in accordance with claim 2.

4. The objective lens for the variable viewing depth endoscope of claim 1, wherein a brightness diaphragm is disposed in the first lens group.

5. An endoscope comprising an objective lens for a variable viewing of depth in accordance with claim 4.

6. The objective lens for the variable viewing depth endoscope of claim 1, wherein the first lens group comprises, successively from the object side, a concave lens having a surface with strong curvature directed onto the image side, a convex lens having a surface with strong curvature directed onto the object side, a brightness diaphragm and a convex lens having a surface with strong curvature directed onto the image side.

7. The objective lens for the variable viewing depth endoscope of claim 6, wherein both of the image-side surface of the convex lens having a surface with strong curvature directed onto the object side and the object-side surface of the convex lens having a surface with strong curvature directed onto the image side are made flat.

8. An endoscope comprising an objective lens for a variable viewing of depth in accordance with claim 7.

9. An endoscope comprising an objective lens for a variable viewing of depth in accordance with claim 6.

10. The objective lens for the variable viewing depth endoscope of claim 1, wherein the mobility of the second lens group is set so as to be located at a location nearly identical to a near point of depth of field with the second lens group moved closest to the image side and a far point of depth of field with the second lens group moved closest to the object side.

11. An endoscope comprising an objective lens for a variable viewing of depth in accordance with claim 10.

12. An endoscope comprising an objective lens for a variable viewing of depth in accordance with claim 1.

* * * * *